United States Patent [19]

Mariani

[11] 4,196,649
[45] Apr. 8, 1980

[54] CIRCULAR SAW PROVIDED WITH TWO ADJUSTABLE CENTER DISTANCE BLADES

[76] Inventor: Paolo Mariani, Via Fabio Filzi, 20063 Cernusco sul Naviglio (Milano), Italy

[21] Appl. No.: 924,637

[22] Filed: Jul. 14, 1978

[51] Int. Cl.² ............................ B23D 45/10; B27B 5/34
[52] U.S. Cl. ........................................ 83/425.4; 83/504
[58] Field of Search ............... 83/425, 425.2, 425.3, 83/425.4, 409, 504

[56] References Cited

U.S. PATENT DOCUMENTS

| Re. 3,101 | 8/1868 | Hayes et al. | 83/425.4 |
| 328,771 | 10/1885 | Garland et al. | 83/425.4 |
| 461,747 | 10/1891 | Fisher | 83/425.4 |
| 700,203 | 5/1902 | Johnson | 83/425.4 |

Primary Examiner—Donald R. Schran
Attorney, Agent, or Firm—Bucknam and Archer

[57] ABSTRACT

A circular saw is provided which comprises two blades, one blade being locked at a fixed point of the driving shaft, and the other being rigid, a bushing coupled to a sleeve rotating with said driving shaft. The bushing slides along the sleeve, under the action of a lead nut coupled to a screw or a worm driving shaft rotated by a geared motor. By appropriate rotation of the driving shaft it is possible to vary continuously the distance between the two blades.

1 Claim, 2 Drawing Figures

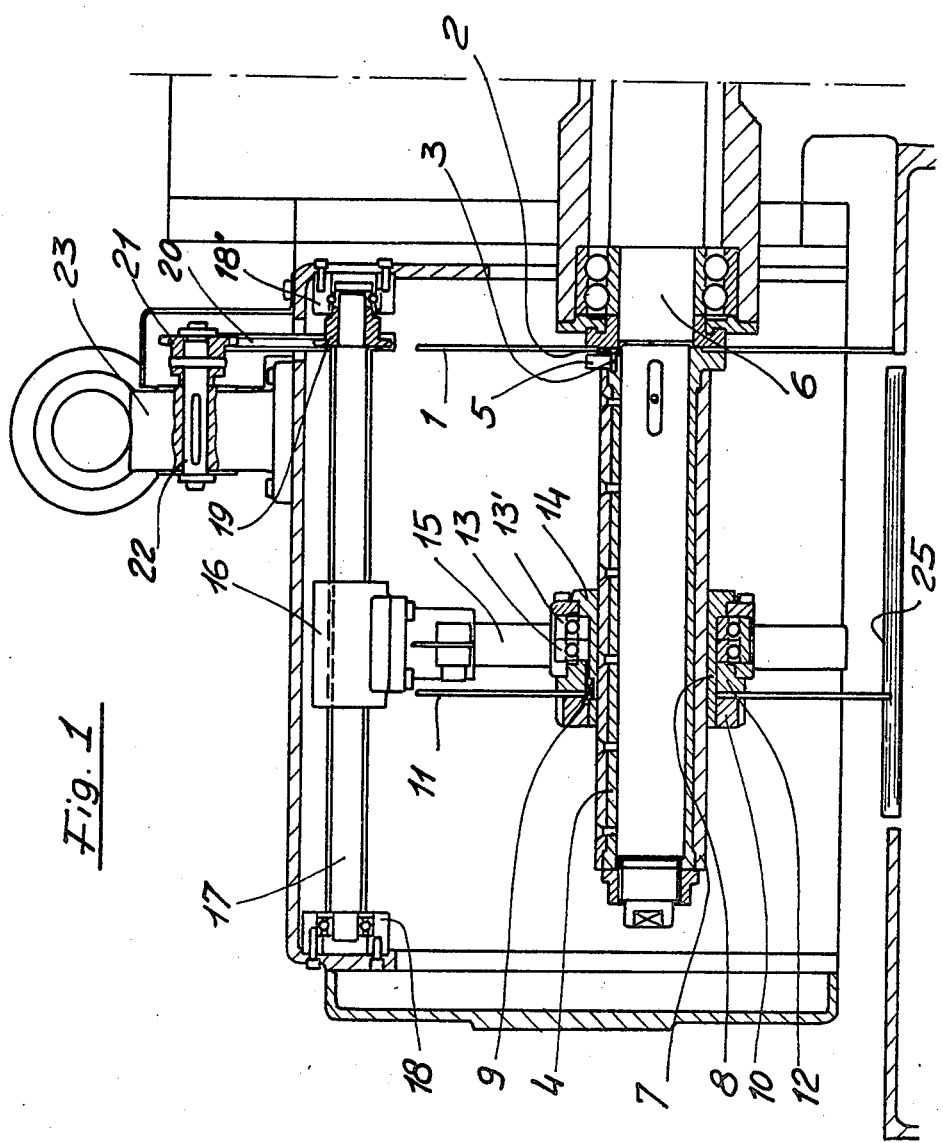

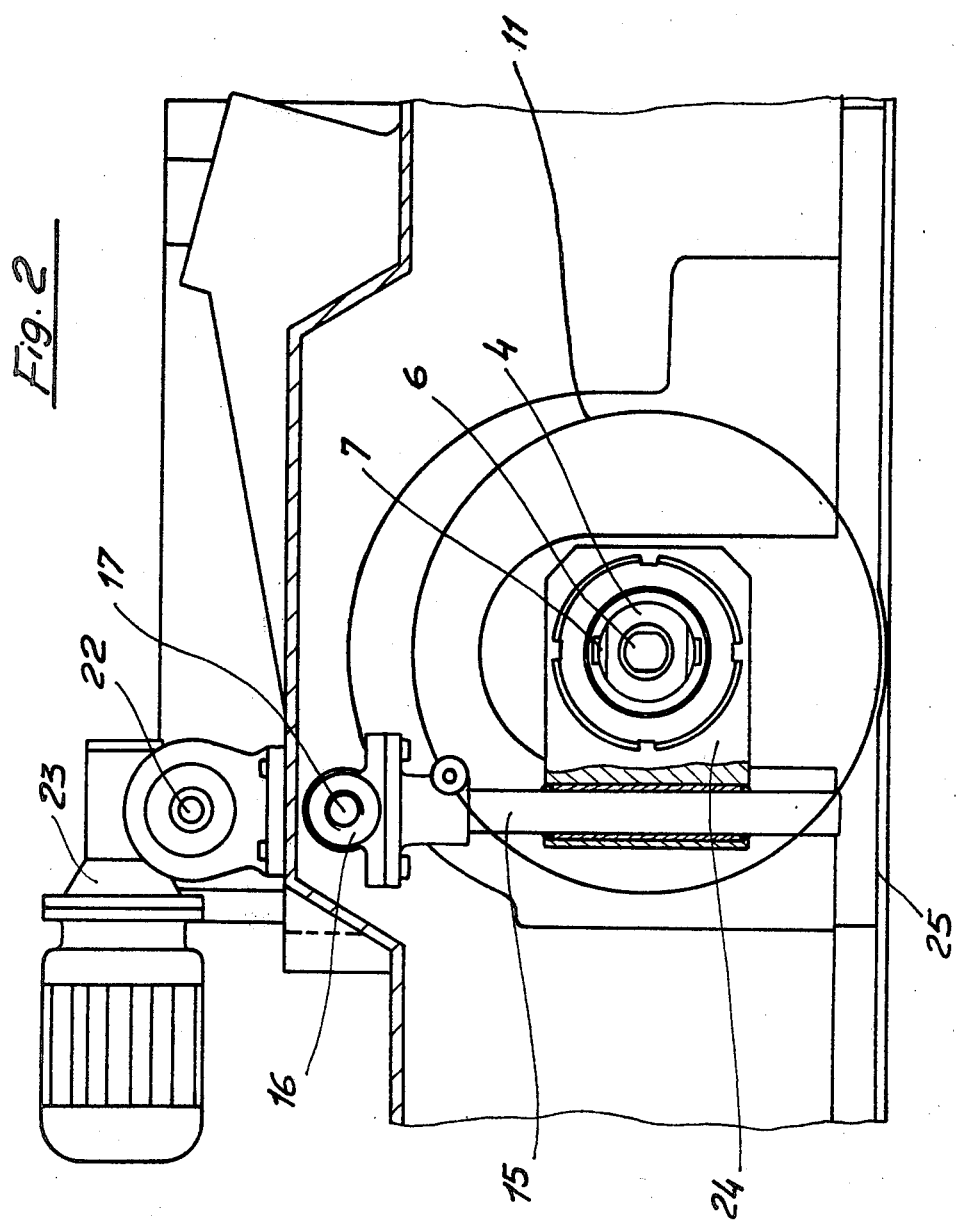

CIRCULAR SAW PROVIDED WITH TWO ADJUSTABLE CENTER DISTANCE BLADES

The present invention relates to a circular saw provided with two continuously adjustable center distance blades.

As it is known, for cutting srips circular saws are normally used provided wth a plurality of blades, suitably spaced from one another, depending on the needs.

To this end, each apparatus is provided with a plurality of series of spacer members, of different thickness, whereby it is possible to vary or adjust, at least within certain limits, the center distance between the several used blades.

As, in particular, it is necessay to trim boards, at both side thereof, there are obviously used only two blades, which are located at a distance equal to the width to be imparted to said boards.

These latter, on the other hand, should also have useful different widths, and in this case it would be necessary to frequently substitute the spacer members separating the blade pairs.

The aforesaid practical drawback is eliminated by the use of the circular saw provided with two adjustable center distance blades, according to the present invention.

In fact this saw is provided with a fixed blade and a blade effective to slide along a sleeve, by the action of a lead nut, coupled to a screw driving shaft.

More precisely on the driving shaft of the instant circular saw, one of the blades is locked, in a suitable way, at a fixed point.

The second blade is fixed to a bushing prismatically coupled to a sleeve rigid with the aforesaid driving shaft.

The aforesaid bushing is effective to slide along said sleeve due to the action of a lead nut, coupled to a screw type of driving shaft.

This latter is rotated by a geared motor assembly through suitable transmission members.

The aforesaid lead nut, in particular, acts on the bushing by means of ball bearings, in such a way as to not prevent said bushing from rotating.

By this approach, it is possible to vary, or adjust, nearly instantaneously, the center distance between the two blades, depending on the specific operative needs.

The aforesaid and other characteristics of functional and constructive nature of the circular saw provided with two adjustable center distance blades according to the present invention will become more apparent from the several figures of the accompanying drawings, where:

FIG. 1 is a vertical section illustrating the operating portion of the instant circular saw;

FIG. 2 is a cross-section illustrating that same operating portion.

Referring particularly to the number references of the several figures of the accompanying drawings, the instant circular saw is provided with a fixed blade (1) which by means of keys (2) and screws (3) is made rigid with one end of a sleeve (4) provided with a suitable flanged portion (5).

Said sleeve rotates with the driving shaft (6) and supports, by means of a prismatic coupling formed by the keys (7) a suitably shaped bushing (8).

The lead nut (16) is helically coupled to a screw or worm driving shaft (17) mounted on two bearing end supporting members (18) and (18').

To said shaft a gear (19) is keyed which is moved by a chain (20) through a gear wheel (21) rigid with the shaft (22) of a geared motor assembly (23).

It should also be pointed out that the supporting member (24) of the driving shaft (6) is able to slide along the aforesaid stem (15).

Accordingly by suitably rotating the driving shaft (17) it is possible to continuously vary the distance between the fixed blade (1) and the blade (11) mounted onto the bushing (8), whereby relating the distance between said blades, on the working plane (25), in the width of the board to be finished.

I claim:

1. A circular saw whieh comprises a driving shaft, a sleeve rotating with said driving shaft, a first blade rigidly connected to one end of said sleeve, a bushing coupled to said driving shaft, said bushing being slidable along said sleeve, a second blade fixed to said bushing, said bushing being provided at one end with a ridge, a pair of bearings on said bushing adjacent said ridge, a spacer on said bushing between said second blade and said pair of bearings said pair of bearings being provided with means for receiving a vertical stem, said vertical stem having a lead nut at the end thereof, said lead nut being helically coupled to a worm driving shaft, said driving shaft being capable of sliding along said vertical stem, a geared motor assembly and means for actuating said worm driving shaft through said geared motor assembly.

* * * * *